(12) United States Patent
Inaba

(10) Patent No.: US 11,538,204 B2
(45) Date of Patent: Dec. 27, 2022

(54) INFORMATION PROVIDING SYSTEM

(71) Applicant: DAIKIN INDUSTRIES, LTD., Osaka (JP)

(72) Inventor: Yoshinao Inaba, Osaka (JP)

(73) Assignee: DAIKIN INDUSTRIES, LTD., Osaka (JP)

( * ) Notice: Subject to any disclaimer, the term of this patent is extended or adjusted under 35 U.S.C. 154(b) by 0 days.

(21) Appl. No.: 17/433,461

(22) PCT Filed: Feb. 26, 2020

(86) PCT No.: PCT/JP2020/007870
§ 371 (c)(1),
(2) Date: Aug. 24, 2021

(87) PCT Pub. No.: WO2020/175589
PCT Pub. Date: Sep. 3, 2020

(65) Prior Publication Data
US 2022/0044458 A1 Feb. 10, 2022

(30) Foreign Application Priority Data
Feb. 27, 2019 (JP) .............................. JP2019-034439

(51) Int. Cl.
*G06T 11/20* (2006.01)
*G06V 10/56* (2022.01)
(Continued)

(52) U.S. Cl.
CPC .............. *G06T 11/206* (2013.01); *F24F 8/90* (2021.01); *F24F 11/38* (2018.01); *F24F 11/52* (2018.01);
(Continued)

(58) Field of Classification Search
CPC ...... G01N 21/88; G01N 21/94; G06T 7/0002; G06T 7/00; G06T 11/206; G06T 11/001;
(Continued)

(56) References Cited

U.S. PATENT DOCUMENTS

| 6,606,394 B1 * | 8/2003 | Park | ...................... G01N 21/88 382/108 |
| 2004/0175026 A1 * | 9/2004 | Tanaka | ...................... G06T 7/40 382/141 |

(Continued)

FOREIGN PATENT DOCUMENTS

| JP | 2004-132683 A | 4/2004 |
| JP | 2005-292066 A | 10/2005 |

(Continued)

OTHER PUBLICATIONS

International Preliminary Report on Patentability and English translation of the Written Opinion of the International Searching Authority dated Aug. 25, 2021 for International Application No. PCT/JP2020/007870.

(Continued)

*Primary Examiner* — Jin Cheng Wang
(74) *Attorney, Agent, or Firm* — Birch, Stewart, Kolasch & Birch, LLP

(57) ABSTRACT

An information providing system provides information relating to dirt in a drain pan of an air conditioner. The information providing system is provided with a computer which is connected to a camera and a user terminal. The computer acquires image data of a target object imaged by the camera, identifies a dirty region in the image data, creates dirt-related information in which the dirty region is highlighted in the image data, and outputs the dirt-related information to the user terminal.

11 Claims, 11 Drawing Sheets

(51) Int. Cl.
  *G06V 20/52* (2022.01)
  *G06T 11/00* (2006.01)
  *F24F 11/52* (2018.01)
  *F24F 13/22* (2006.01)
  *F24F 11/38* (2018.01)
  *F24F 8/90* (2021.01)

(52) U.S. Cl.
  CPC ............ *F24F 13/22* (2013.01); *F24F 13/222* (2013.01); *G06T 11/001* (2013.01); *G06V 10/56* (2022.01); *G06V 20/52* (2022.01)

(58) Field of Classification Search
  CPC ....... G06T 2200/24; G06T 2207/10024; G06T 2207/10064; G06T 7/0004; G06T 7/70; G06V 10/56; G06V 20/52
  See application file for complete search history.

(56) References Cited

U.S. PATENT DOCUMENTS

| | | | |
|---|---|---|---|
| 2008/0226148 A1* | 9/2008 | Gu | G06T 5/40 382/128 |
| 2009/0087022 A1 | 4/2009 | Fukuda et al. | |
| 2012/0323374 A1* | 12/2012 | Dean-Hendricks | F24F 8/10 700/276 |
| 2012/0323375 A1* | 12/2012 | Dean-Hendricks | F24F 8/10 700/276 |
| 2014/0193042 A1* | 7/2014 | Allen | G06T 7/0004 382/108 |
| 2015/0330913 A1* | 11/2015 | Heskee, III | G01N 21/94 356/239.8 |
| 2016/0117845 A1* | 4/2016 | Al-Hamouz | G06T 7/001 382/156 |
| 2017/0066020 A1* | 3/2017 | Lapointe | B08B 3/08 |
| 2017/0184393 A1* | 6/2017 | Chen | G01N 33/0075 |
| 2019/0107490 A1* | 4/2019 | Schindler | G01N 21/6486 |
| 2019/0164271 A1* | 5/2019 | Herchenbach | G06V 10/457 |
| 2019/0244375 A1* | 8/2019 | Choi | G06T 7/11 |
| 2019/0340455 A1* | 11/2019 | Jung | G06V 10/28 |
| 2019/0369031 A1* | 12/2019 | Niikura | G01N 21/94 |
| 2019/0392262 A1* | 12/2019 | Dasari | G06K 9/6267 |
| 2021/0190357 A1* | 6/2021 | Ishizaka | F24F 11/89 |

FOREIGN PATENT DOCUMENTS

| | | |
|---|---|---|
| JP | 2007-46864 A | 2/2007 |
| JP | 2007-255840 A | 10/2007 |
| JP | 2011-143644 A | 7/2011 |
| JP | 2013-223450 A | 10/2013 |
| WO | WO 2007/141858 A1 | 12/2007 |

OTHER PUBLICATIONS

International Search Report for PCT/JP2020/007870 dated May 26, 2020.

* cited by examiner

INFORMATION PROVIDING SYSTEM

The present disclosure relates to an information providing system that provides information related to contamination.

BACKGROUND ART

Patent Document 1 describes a known information providing system that provides information related to contamination. The information providing system of Patent Document 1 (information management center in Patent Document 1) obtains an image of a filter, binarizes every pixel of the image, divides the binarized image into predetermined blocks, and calculates a diagnostic value using data related to the blocks. Further, the information providing system outputs processed data indicating the necessity for filter replacement or the like to a mobile phone terminal.

PRIOR ART DOCUMENT

Patent Document

Patent Document 1: Japanese Laid-Open Patent Publication No. 2005-292066

SUMMARY OF THE INVENTION

Problems that the Invention is to Solve

A user who receives a message from an information management center indicating that a part needs to be replaced may not be able to determine the degree of replacement necessity. Further, information indicating why the part needs to be replaced may require expert knowledge to understand. In such a situation, the user may not or may not be able to understand how to respond to a message related to contamination. Accordingly, one objective of the present disclosure is to provide a contamination-related information providing system that provides a user with information related to contamination that is easy to understand.

Means for Solving the Problems

An information providing system that solves the above problems provides information related to contamination of a drain pan of an air conditioner. The information providing system includes a computer connected to a camera and a user terminal. The computer is configured to obtain image data of a subject captured by the camera, find a contaminated region in the image data, generate contamination-related information in which the contaminated region is highlighted in the image data, and output the contamination-related information to the user terminal. With this configuration, the contaminated region is highlighted so that the user can recognize and understand the information related to contamination.

In the information providing system, the computer is configured to obtain first image data of a preceding time and second image data of a subsequent time after the preceding time, find the contaminated region in the second image data, generate the contamination-related information including the first image data and the second image data, and highlight the contaminated region in the second image data in the contamination-related information. With this configuration, the first image data of the preceding time is compared to the second image data so that the user can recognize the degree of contamination advancement.

In the information providing system, the computer is configured to identify and highlight a type of contamination. With this configuration, the types of contamination are identified so that the user can easily recognize how the subject is contaminated.

In the information providing system, the computer is configured to identify the type of contamination by a hue. The types of contamination can be distinguished in accordance with hue. In the above-described configuration, the types of contamination are accurately identified using this technical feature.

In the information providing system, the computer is configured to highlight the type of contamination to allow for identification by adjusting saturation. With this configuration, the user can visually check contamination and distinguish the type of contamination.

In the information providing system, the computer is configured to form a contamination chart indicating a change in a contaminant amount with respect to elapsed time based on image data of the subject captured at different times, generate the contamination-related information including the contamination chart and a threshold value of the contaminant amount indicating when to perform cleaning, and highlight a time point at which the contaminant amount reaches the threshold value of the contamination in the contamination chart. With this configuration, the user can easily recognize the time point at which the contaminant amount will reach the contaminant amount threshold value.

In the information providing system, the computer is configured to calculate a failure probability in a predetermined future period based on the image data of the subject, generate the contamination-related information including the failure probability, and highlight the failure probability when the failure probability is greater than a predetermined probability. This configuration allows the user to recognize the failure probability.

In the information providing system, the computer is configured to calculate an air pollution level in a predetermined future period based on the image data of the subject, generate the contamination-related information including the air pollution level, and highlight the air pollution level when the air pollution level is greater than an upper limit value. This configuration allows the user to recognize the air pollution level.

In the information providing system, the computer is configured to obtain image data of an additional subject that differs from the subject captured by a camera, form a contamination chart indicating a change in a contaminant amount with respect to elapsed time based on image data of the additional subject captured at different times, generate the contamination-related information including a chart that shows both of the contamination chart for the subject and the contamination chart for the additional subject with a common time axis, and highlight the contamination chart for the subject in the contamination-related information. With this configuration, the tendency of contamination in the subject can be recognized through comparison with contamination in the additional subject.

MODES FOR CARRYING OUT THE INVENTION

Figure 1:
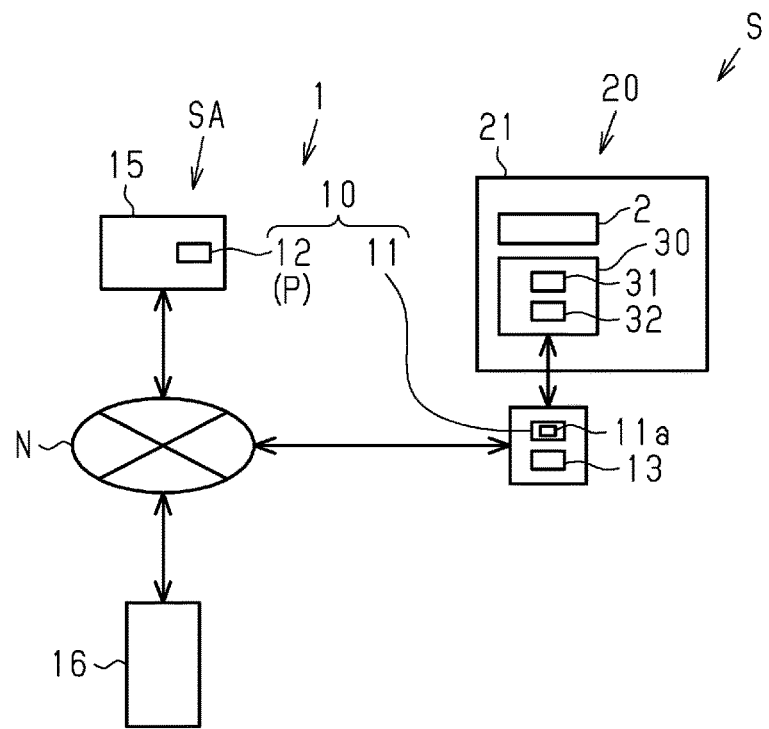
FIG. 1 is a schematic diagram of an information providing system.

An information providing system SA in accordance with the present embodiment will now be described.

The information providing system SA provides a user with information related to contamination of a drain pan 26 of an air conditioner 20. The information providing system SA includes a computer P. The computer P is connected to a camera 30 and a user terminal 16. The computer P may be connected to the camera 30 and the user terminal 16 via a network N or directly by cables.

The user terminal 16 is, for example, a terminal connectable to the network N. The user terminal 16 includes a mobile phone, a laptop personal computer, a personal computer, and a tablet-type personal computer.

The computer P obtains image data of a subject 2 captured by the camera 30. The camera 30 captures an image of contamination on the subject 2. In an example, the computer P obtains the image data through communication established between another device (for example, contamination detector 1, described later). In another example, the computer P obtains the image data through an input operation performed by a user. The image data is an image showing contamination. The image data includes a captured image 40 and a processed image. The captured image 40 is captured by the camera 30. The processed image is obtained by performing a process that sharpens the captured image 40. The computer P finds a contaminated region in the image data, highlights the contaminated region in the image data to generate contamination-related information, and outputs the contamination-related information to the user terminal 16.

The computer P of the information providing system SA and a contamination detector 1 may be included in the same system. The computer P of the information providing system SA may be one element of the contamination detector 1. In the present embodiment, the information providing system SA is one element of the contamination detector 1. In the contamination detector 1, the computer P of the information providing system SA serves as a computing unit 12 of the contamination detector 1.

The contamination detector 1 will now be described with reference to FIG. 1.

The contamination detector 1 detects contamination of the subject 2. In the present embodiment, contamination includes at least one of collected contaminants or turbid water. Contamination is detected when collected contaminants are detected, when turbid water is detected, or when whichever one of collected contaminants and turbid water is detected. The subject 2 of contamination detection is the drain pan 26.

The contamination detector 1 includes a controller 10. The controller 10 obtains the captured image 40 of the subject 2. The controller 10 calculates a degree of contamination advancement based on color elements of the captured image 40 of the subject 2.

The controller 10 includes an acquiring unit 11 and the computing unit 12 (computer P). The acquiring unit 11 obtains the captured image 40 of the subject 2. The computing unit 12 calculates the degree of contamination advancement based on the color elements of the captured image 40 of the subject 2. The acquiring unit 11 is connected to the camera 30. The acquiring unit 11 and the computing unit 12 may be accommodated in the same casing and packaged as a single device. Alternatively, as described below, the acquiring unit 11 and the computing unit 12 may be arranged at different locations and connected to the network N. The elements of the controller 10 in accordance with the present embodiment are dispersed in the network N. The controller 10 (acquiring unit 11, computing unit 12) includes one or more central processing units (CPUs) or micro-processing units (MPUs). The controller 10 can be circuitry including: 1) one or more processors that run on a computer program (software) to execute various types of processes; 2) one or more exclusive hardware circuits such as an application specific integrated circuit (ASIC) that execute at least part of various types of processes, or 3) a combination of the above. The processor includes a CPU and a memory, such as a random-access memory (RAM) or a read-only memory (ROM). The memory stores program codes or commands that are configured to have the CPU execute processes. The memory, which is a computer readable medium, may be any available medium that is accessible by a versatile or dedicated computer.

The acquiring unit 11 is arranged in the air conditioner 20 or in the proximity of the air conditioner 20.

The acquiring unit 11 obtains and stores the captured image 40 sent from the camera 30. The acquiring unit 11 holds identification information of the subject 2 or a device including the subject 2. In the present embodiment, the acquiring unit 11 holds the identification information of the air conditioner 20. Preferably, the acquiring unit 11 holds location information of the subject 2 or a device including the subject 2. The location information includes the location (latitude and longitude or address) of the subject 2. In the present embodiment, the acquiring unit 11 holds the location information of the air conditioner 20 that includes the drain pan 26. Further preferably, the acquiring unit 11 includes purpose information of the device that includes the subject 2. The purpose information is information of how the room in which the subject 2 is installed will be used and includes, for example, a type of a store. The acquiring unit 11 obtains the identification information, the location information, and the purpose information through an input operation. The acquiring unit 11 is connected to a communication unit 13. The communication unit 13 may be an element of the controller 10.

The communication unit 13 controls communication established between the acquiring unit 11 and the computing unit 12. The communication unit 13 outputs the captured image 40 to the computing unit 12 in response to an internal instruction or an external instruction. Preferably, the communication unit 13 outputs at least one of the identification information, the location information, or the purpose information to the computing unit 12 in response to an internal instruction or an external instruction. An internal instruction is an instruction formed at a preset time. For example, an internal instruction is formed by an internal circuit of the communication unit 13 periodically or when a predetermined condition is satisfied (for example, when signal receiving sensitivity is higher than predetermined value during wireless communication). An external instruction is an instruction based on a request from the computing unit 12 of a cloud server 15. The communication unit 13 and the acquiring unit 11 may be accommodated in the same casing.

The computing unit 12 may be installed at any location as long as the computing unit 12 can obtain information from the acquiring unit 11. For example, the computing unit 12 is arranged in the cloud server 15 that is connected to the network N.

As shown in FIG. 1, the contamination detector 1 may be an element of an air conditioning system S. For example, the air conditioning system S includes the contamination detector 1 and the air conditioner 20. The air conditioner 20 is connected to the network N via the communication unit 13 of the controller 10 of the contamination detector 1. In this case, the computer P of the information providing system SA in the present embodiment is an element of the air conditioning system S.

Figure 2:
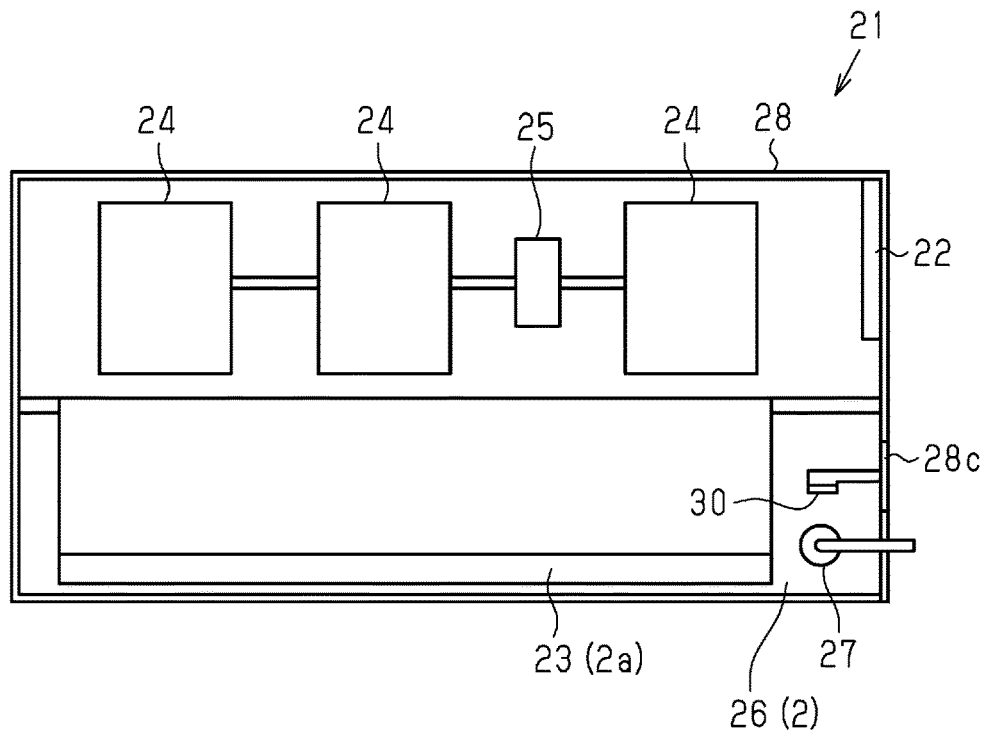
FIG. 2 is a plan view showing the structure inside an indoor unit.
Figure 3:
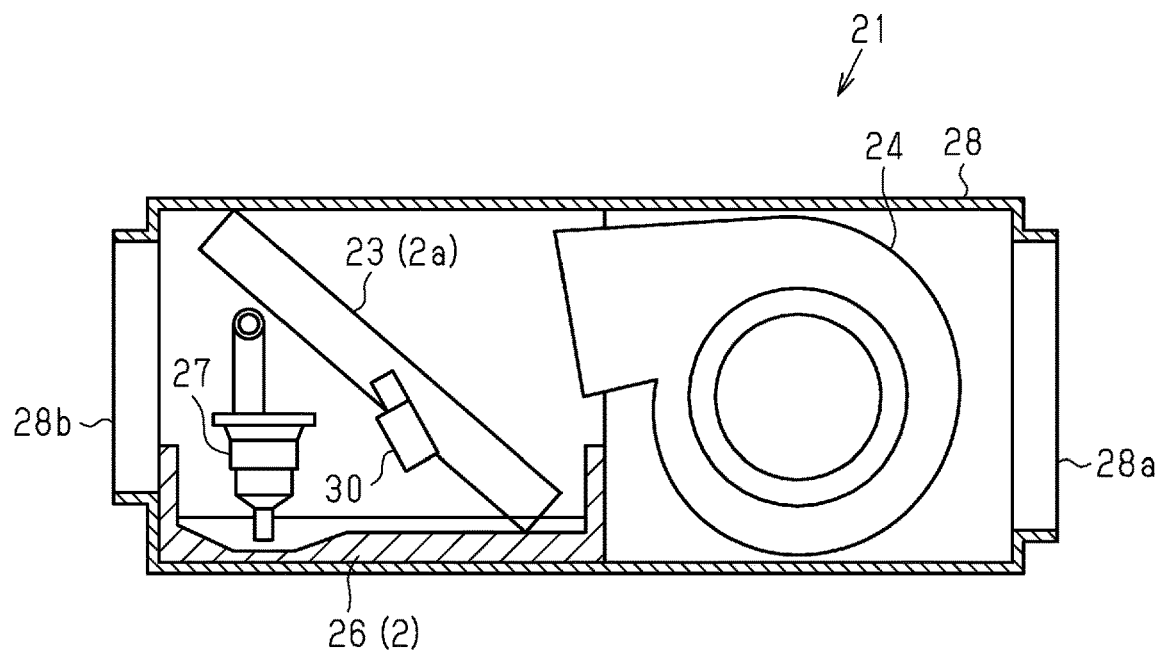
FIG. 3 is a side view showing the structure inside the indoor unit.

The air conditioner 20 will now be described with reference to FIGS. 2 and 3. FIG. 2 is a plan view showing the structure inside an indoor unit 21 in a state in which an upper wall of the indoor unit 21 is removed from the air conditioner 20. FIG. 3 is a side view showing the structure inside the indoor unit 21 of the air conditioner 20 in a state in which a side wall is removed from the indoor unit 21.

There is no limit to the type of the air conditioner 20 that is tested for contamination. For example, a ceiling-embedded air conditioner 20 may be tested for contamination. The indoor unit 21 of the ceiling-embedded air conditioner 20 requires time to be internally tested. Thus, the use of a camera to monitor the indoor unit 21 of the ceiling-embedded air conditioner 20 improves maintenance efficiency. In the present embodiment, the indoor unit 21 of the air conditioner 20 is embedded in the ceiling and connected to a ceiling duct. The indoor unit 21 is connected to an outdoor unit by a refrigerant pipe. The indoor unit 21 is installed in the ceiling.

As shown in FIGS. 2 and 3, the indoor unit 21 includes an air-conditioning controller 22, a heat exchanger 23, fans 24, a fan motor 25, the drain pan 26, a drain pump 27, and a case 28. The fan motor 25 rotates the fans 24. The drain pan 26 is located under the heat exchanger 23. The drain pump 27 drains water out of the drain pan 26. The case 28 includes an inlet 28*a* and an outlet 28*b*. Preferably, the drain pan 26 includes a wall that is colored such that contamination is distinguishable. Preferably, the color of the wall of the drain pan 26 is white or a color close to white.

The case 28 includes a maintenance cover 28*c* allowing for maintenance of the inside of the case 28. The maintenance cover 28*c* is arranged proximate to the drain pan 26 and the drain pump 27. The camera 30 is attached to the inner side of the maintenance cover 28*c*. The camera 30 is attached to the maintenance cover 28*c* to capture an image of at least part of the bottom of the drain pan 26.

The camera 30 includes an image-capturing unit 31 and an image-capturing control unit 32 (refer to FIG. 1). The image-capturing unit 31 captures an image of part of the drain pan 26 when under the control of the image-capturing control unit 32 to form the captured image 40.

In an example, the image-capturing unit 31 captures an image of the drain pan 26 on condition that the water surface is still. The image-capturing control unit 32 determines whether the water surface is still. A still-water surface refers to a state in which the water surface in the drain pan 26 is still. The image-capturing control unit 32 determines whether the water surface is still from at least one of action of the drain pump 27, rotation of the fans 24, or changes in the captured images 40 obtained by continuously monitoring the captured images 40. When the still-water surface condition is satisfied, the image-capturing control unit 32 instructs the image-capturing unit 31 to capture an image. For example, the image-capturing control unit 32 determines whether the still-water surface condition is satisfied when detecting collected contaminants.

In another example, the image-capturing unit 31 captures an image of the drain pan 26 on condition that water is flowing. The image-capturing control unit 32 determines whether the water is flowing. Water flows in a state in which the water in the drain pan 26 is in motion. The image-capturing control unit 32 determines whether the water is flowing from at least one of action of the drain pump 27 or changes in the captured images 40 obtained by continuously monitoring the captured images 40. When the water-flowing condition is satisfied, the image-capturing control unit 32 instructs the image-capturing unit 31 to capture an image. For example, the image-capturing control unit 32 determines whether the water-flowing condition is satisfied when detecting turbid water as contamination.

As described above, the image-capturing control unit 32 controls the time at which image capturing is performed. Further, the image-capturing control unit 32 transmits the captured image 40 formed by the image-capturing unit 31 to the acquiring unit 11. The image-capturing control unit 32 transmits the captured image 40 to the acquiring unit 11 in response to an internal instruction. The internal instruction is preset.

The captured image 40 is transmitted to the computing unit 12 as described below. The captured image 40, which is formed by the image-capturing unit 31 of the camera 30, is output to the acquiring unit 11 and stored in a memory 11*a* of the acquiring unit 11. The captured image 40 stored in the acquiring unit 11 is transmitted via the network N to the computing unit 12 of the cloud server 15 in response to an internal instruction of the communication unit 13 or an external instruction.

Figure 4:
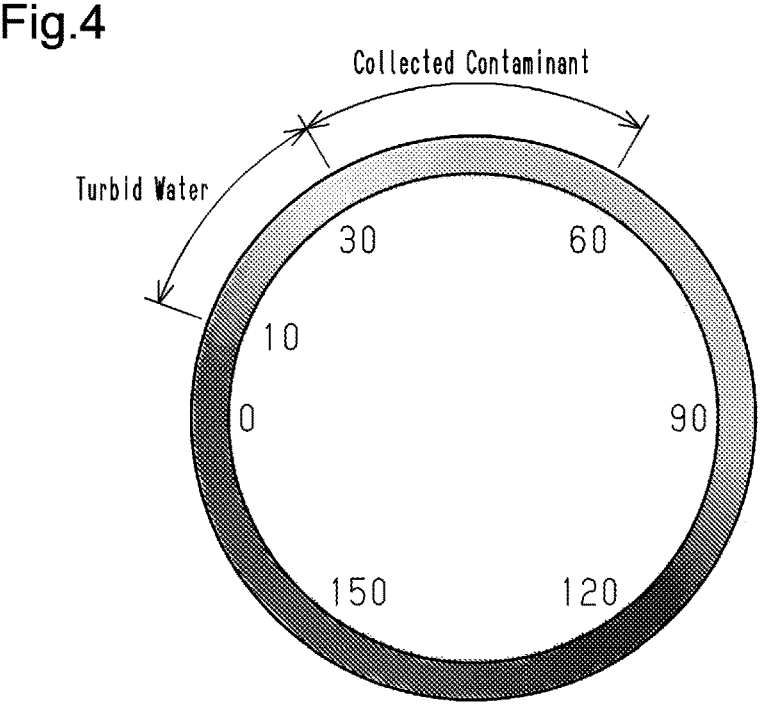
FIG. 4 is a diagram of a color wheel indicating ranges of collected contaminants and turbid water.

The computing unit 12 (computer P) of the controller 10 will now be described with reference to FIG. 4.

The computing unit 12 digitizes contamination of the subject 2 in response to an instruction from a user or at a predetermined time. Specifically, the computing unit 12 calculates the hues of every pixel in the captured image 40 of the drain pan 26. When the captured image 40 is in RGB format, the computing unit 12 converts the captured image 40 based on the RGB-to-HSV conversion formula to obtain the hue (H) for each pixel. In the present embodiment, the computing unit 12 uses a scale of 0 to 180 for hue (refer to FIG. 4).

Contamination of the drain pan 26 will now be described. When the hue of contamination of the drain pan 26 is analyzed, the contamination has a reddish yellow-green color (hue of 10 to 30) or a green color (hue of 30 to 60). The hue of contamination is in a range of 10 or greater and 60 or less. Collected contaminants have a green color or a greenish color and a hue that is in a range of 30 or greater and 60 or less. Turbid water has a yellow-green color that is somewhat red and a hue that is in a range of 10 or greater and less than 30. The hue of collected contaminants and the hue of turbid water of the drain pan 26 differ from the hue of the wall of the drain pan 26. Thus, contamination of the drain pan 26 can be detected based on the hue. Further, the difference in the hue of collected contaminants and the hue of turbid water allows collected contaminants to be distinguished from turbid water.

Preferably, a subject range 40a, which is subject to contamination detection, is set in the captured image 40 to accurately detect contamination of the drain pan 26. The captured image 40 may include part of the heat exchanger 23 and part of the drain pump 27. In this case, the subject range 40a for contamination detection corresponds to a region excluding the heat exchanger 23 and the drain pump 27 from the captured image 40. The subject range 40a is set in advance. The computing unit 12 detects contamination in the subject range 40a.

Figure 5:
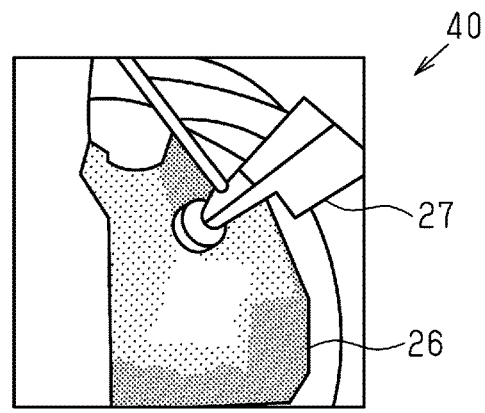
FIG. 5 is a diagram of a captured image.
Figure 6:
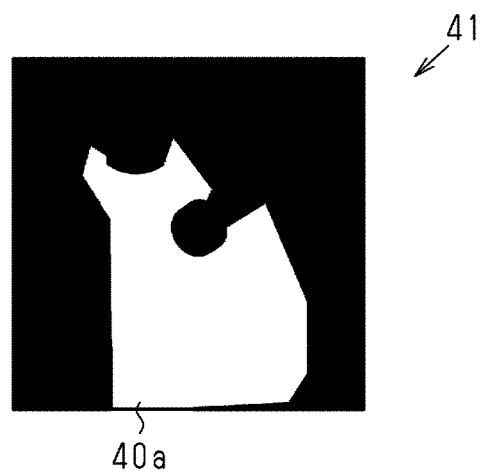
FIG. 6 is a diagram of a mask.
Figure 7:
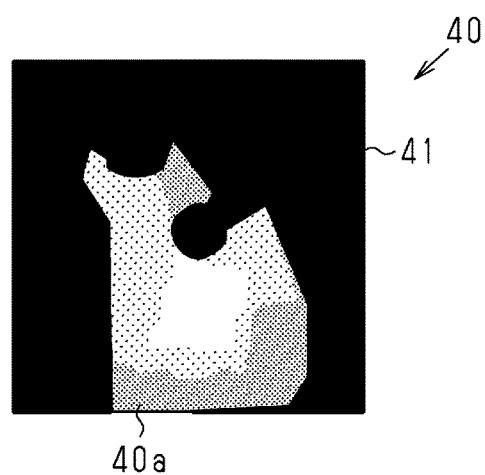
FIG. 7 is a diagram of the captured image on which the mask is superimposed.
Figure 8:
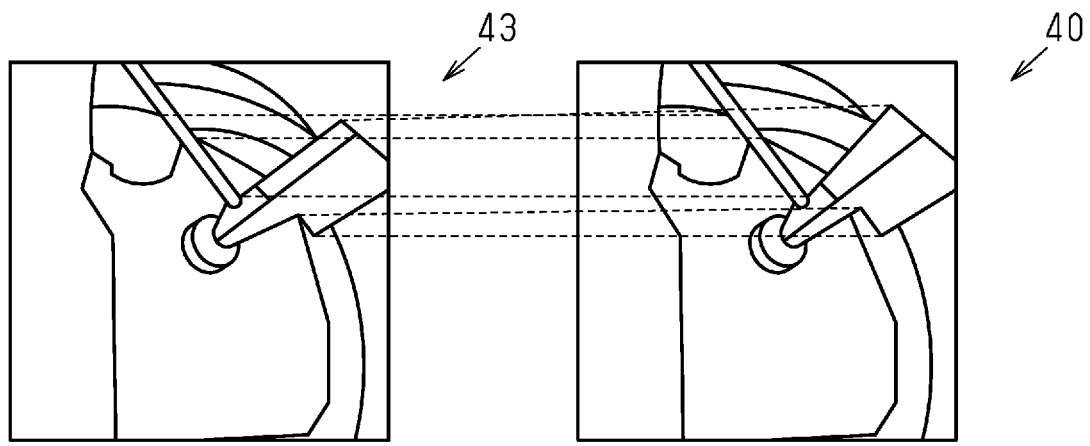
FIG. 8 is a diagram showing matching features of a template captured image and the captured image.
Figure 9:
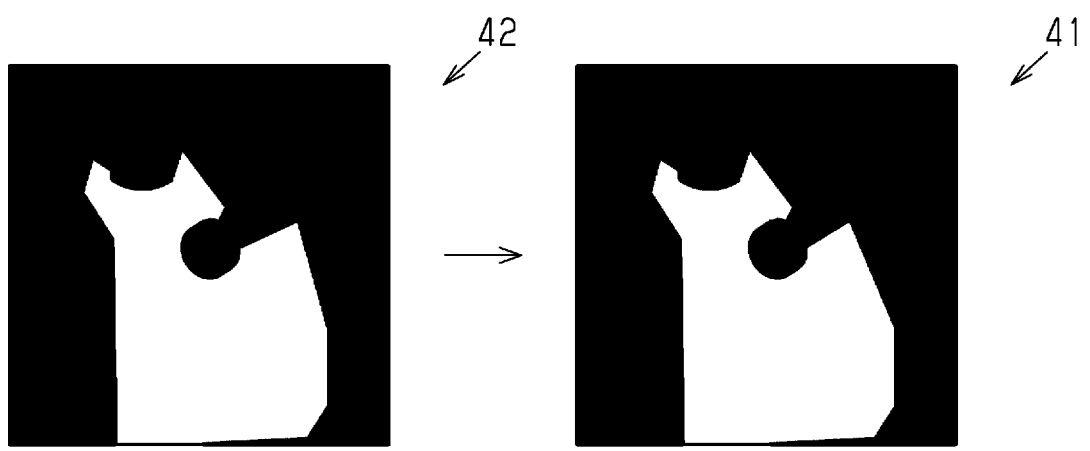
FIG. 9 is a diagram showing the relationship of a template mask and the mask.

An example for setting the subject range 40a will now be described with reference to FIGS. 5 to 9. FIG. 5 is a diagram of the captured image 40. FIG. 6 is a diagram of a mask 41. FIG. 7 is a diagram of the captured image 40 on which the mask 41 is superimposed. In FIG. 7, a densely-dotted region indicates a region of collected contaminants, and a sparsely-dotted region indicates a region of turbid water. In the captured image 40 of FIG. 7, there is no clear visual distinction between the region of collected contaminants and the sparsely-dotted region. FIG. 8 is a diagram showing matching features of a template captured image 43 and the captured image 40. FIG. 9 is a diagram showing the relationship of a template mask 42 and the mask 41.

The computing unit 12 holds the mask 41 that is superimposed on the captured image 40. The mask 41 is black and has no hue except for the portion corresponding to the subject range 40a of the captured image 40. The portion of the mask 41 corresponding to the subject range 40a of the captured image 40 is transparent. When the mask 41 is superimposed on the captured image 40, the captured image 40 becomes black except for the portion corresponding to the subject range 40a. When areas in the captured image 40 are calculated based on hue, the area in black portion will be zero because black is not associated with hue. Thus, when the computing unit 12 of the area for each hue in the entire captured image 40, on which the mask 41 is superimposed, this will result in the calculation of the area of each hue in the subject range 40a of the captured image 40. In this manner, the use of the mask 41 simplifies the calculation of the area for each hue in the subject range 40a of the captured image 40.

The computing unit 12 holds the template captured image 43 and the template mask 42. The template captured image 43 is prepared in advance for each model of the air conditioner 20. The template mask 42 is formed in advance for each model of the air conditioner 20. Variations in how the camera 30 is installed may result in differences in the position of the drain pan 26 in the captured image 40 between air conditioners 20 even if the model is the same. Thus, it is preferred that the mask 41 is matched with the drain pan 26, which is subject to contamination detection, of each air conditioner 20 to accurately detect contamination. For example, the computing unit 12 matches the features of the template captured image 43 with the features of the captured image 40, which is the subject of contamination detection (refer to FIG. 8), and forms a projective transformation matrix based on the matching result. The computing unit 12 uses the formed projective transformation matrix to convert the template mask 42 into the mask 41 (refer to FIG. 9).

Information provided by the computing unit 12 to the user terminal 16 will now be described.

As described above, the computing unit 12 finds a contaminated region in the captured image 40 and outputs contamination-related information to the user terminal 16. The contamination-related information includes information highlighting the contaminated region in the captured image 40.

The formation of the captured image 40 that is highlighted for display will now be described with reference to FIG. 10.

The captured image 40 of the drain pan 26 may be used when determining the necessity for maintenance. However, a shadowed portion of the captured image 40 is blackish and thus contamination is difficult to recognize. Accordingly, image processing is performed on the captured image 40 to facilitate visual recognition of the contamination. An example of image processing performed on the captured image 40 will now be described below.

Figure 10:
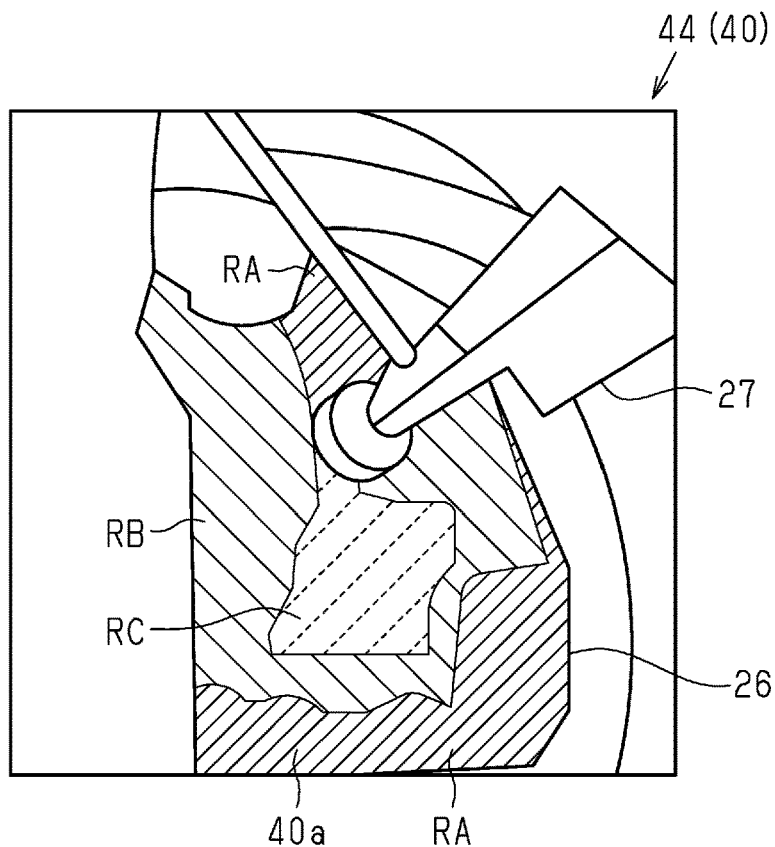
FIG. 10 is a diagram showing the captured image converted to highlighting colors.

As shown in FIG. 10, the computing unit 12 converts a contaminant-collected region and a turbid water region found in the subject range 40a of the captured image 40, which has been converted into the HSV format, into highlighting colors that are easily recognized and forms a highlighted image 44. In an example, regions RA where collected contaminants were found are colored in blue, a region RB where turbid water was found is colored in light blue, and a region RC in the subject range 40a where collected contaminants and turbid water were not found is colored in red. When showing the captured image 40 of the drain pan 26 on a display device, the computing unit 12 generates the contamination-related information including the highlighted image 44 that is converted to the highlighting colors. The contamination-related information may include a raw captured image 40 in addition to the highlighted image 44. The computing unit 12 outputs the contamination-related information in response to a request from a user.

Further, the computing unit 12 outputs the contamination-related information to the user terminal 16 in response to a request from the user terminal 16. Furthermore, the computing unit 12 outputs the highlighted image 44 as the contamination-related information to the user terminal 16 in accordance with a rule set in advance between the computing unit 12 and the user terminal 16. Preferably, the contamination-related information includes the identification information, the location information, and the purpose information of the air conditioner 20 that output the original captured image 40 of the highlighted image 44.

The computing unit 12 may further include the following functionality. The computing unit 12 obtains a first captured image (first image data) captured at a preceding time and a second captured image (second image data) captured at a subsequent time after the preceding time. The computing unit 12 finds a contaminated region in the second captured image and generates the contamination-related information including the first captured image and the second captured image. In an example, the first captured image and the second captured image are arranged next to each other in the same frame. The computing unit 12 highlights the contaminated region of the second captured image in the contamination-related information. Further preferably, the computing unit 12 outputs the contamination-related information including the highlight to the user terminal 16 at a predetermined time or in response to a request of a user.

In an example, the first captured image captured at a preceding time is an image of the air conditioner 20 when the air conditioner 20 is initially installed. The second captured image captured at a subsequent time is an image of the air conditioner 20 captured when preparing for maintenance. When the second captured image is compared to the first captured image, expansion of contamination can be recognized from the image. The computing unit 12 finds the contaminated region from the second captured image based on the hue of each pixel of the captured image 40 in the second captured image. The contaminated region is determined through the method described above. Further, the computing unit 12 highlights the contaminated region so that the contaminated region becomes distinguishable.

The contaminated region is, for example, converted to a predetermined color (for example, blue) that differs from the surrounding portion. In another example, the contaminated region is enclosed by a color (for example, blue) that differs from the surrounding portion. An image prior to processing includes shadowed portions and portions other than the subject range 40a that are not tested for contamination. Thus, contaminated regions are difficult to recognize. When the contaminated region is highlighted, expansion of the contaminated region can be easily recognized.

Figure 11:
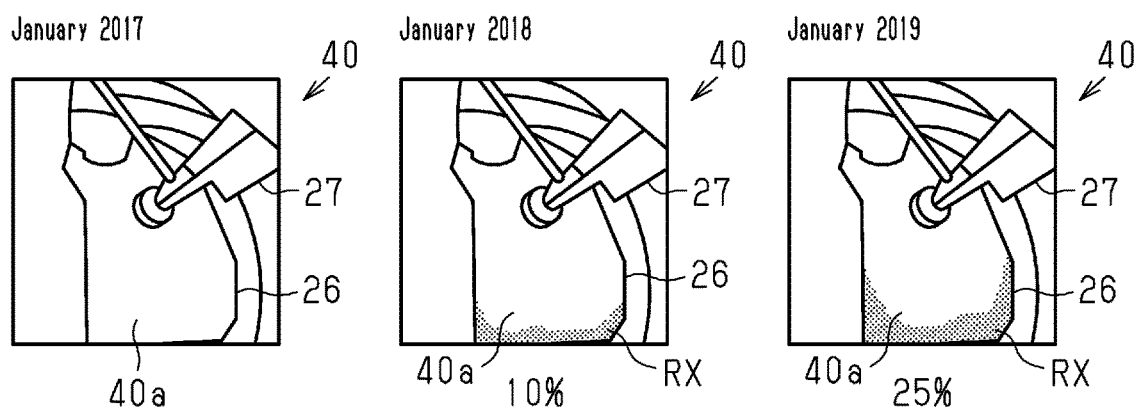
FIG. 11 is a diagram showing periodically captured images.

As shown in FIG. 11, the computing unit 12 may output related information, such as periodically captured images 40, to the user terminal 16 at a predetermined time or in response to a request of a user. The related information shown in FIG. 11 includes the captured images 40 that are captured annually. In each captured image 40, a contaminated region RX is highlighted. Specifically, the contaminated region RX is converted to a highlighting color that is easily recognized. Further, the related information shows an area ratio of the contaminated region RX. The area ratio, which will be described later, is defined as a ratio of the area of the contaminated region RX to the area of the subject range 40a of the captured image 40. Such a message informs the user of the degree of contamination advancement.

The computing unit 12 may include the following functionality.

The computing unit 12 calculates a contamination level for each pixel of the captured image 40 and generates the contamination-related information indicating the contamination level of each section in the subject range 40a. Preferably, the computing unit 12 generates the contamination-related information for collected contaminants and turbid water. The contamination level indicates the degree of contamination. Specifically, for collected contaminants, as a portion in the subject range 40a becomes closer to blue-green and the hue scale is in the range of 30 to 60, that is, as the hue value becomes larger, the computing unit 12 assigns a larger value as the contamination level. In case of turbid water, when a portion in the subject range 40a becomes closer to red and the hue scale is in the range of 10 to 30, that is, as the hue value becomes smaller, the computing unit 12 assigns a larger value as the turbid level. The computing unit 12 performs a color differentiating process on the captured image 40 based on the contamination level of each pixel and outputs the color-differentiated captured image 40 as the contamination-related information.

Figure 12:
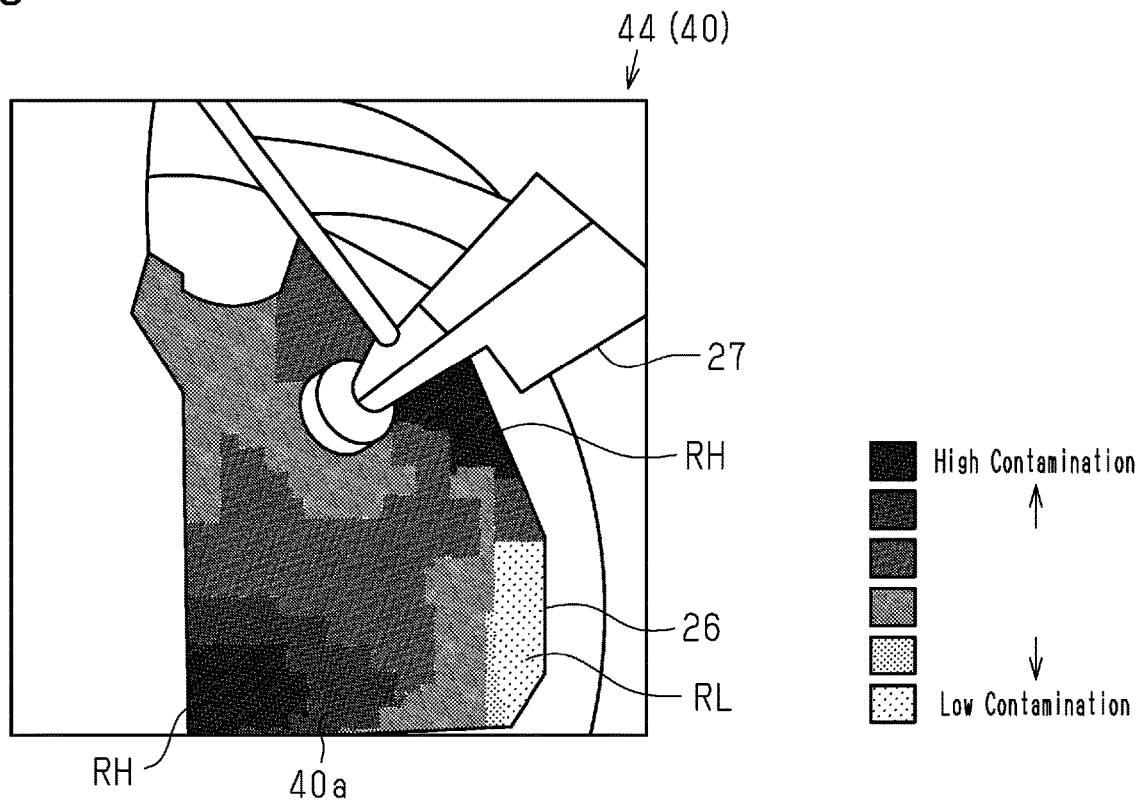
FIG. 12 is a diagram showing the captured image colored in accordance with contamination level.

FIG. 12 is a diagram showing the captured image 40 that is color-differentiated in accordance with collected contaminant level. In the present example, in the subject range 40a of the captured image 40, a portion RH with a high collected contaminant level is shown in red, and a portion RL with a low collected contaminant level is shown in dark blue. Such color-differentiating allows high contamination level portions to be visually recognized in the subject range 40a.

The computing unit 12 may further include the following functionality.

The computing unit 12 identifies and highlights different types of contamination. As described above, the different types of contamination include contaminants collected on a wall and turbid water. As described above, the hue range of collected contaminants differs from that of turbid water. The computing unit 12 identifies the types of contamination (i.e., collected contaminants and turbid water) from the hue of each pixel in the captured image 40. Further, the computing unit 12 highlights the captured image 40 so that collected contaminants and turbid water can be identified. Furthermore, the computing unit 12 generates the contamination-related information in which collected contaminants and turbid water are highlighted in an identifiable manner. For example, the region of collected contaminants is converted to a color (for example, blue) differing from the surrounding portion (same as example shown in FIG. 10). In another example, the region of collected contaminants is enclosed by a color (for example, blue) that differs from the surrounding portion. The turbid water region is converted to a color (for example, light blue) that differs from the surrounding portion (same as example shown in FIG. 10). In another example, the turbid region is enclosed by a color (for example, light blue) that differs from the surrounding portion. The computing unit 12 may also highlight the different types of contamination to allow for identification by adjusting the saturation. For example, the saturation in the region of collected contaminant is decreased from that of the turbid region. Further preferably, the computing unit 12 outputs the contamination-related information, in which the types of contamination are identified, to the user terminal 16 at a predetermined time or in response to a request of a user.

The computing unit 12 may further include the following functionality.

Figure 13:
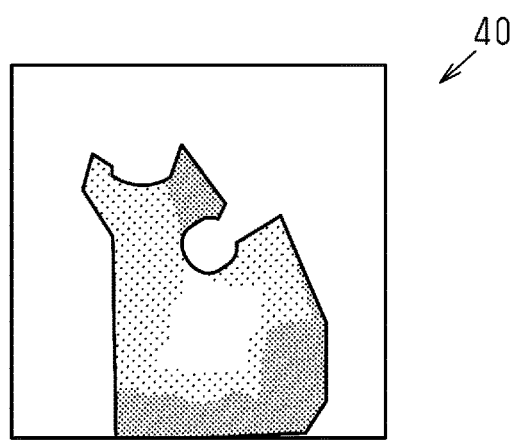
FIG. 13 is a diagram of the captured image from which only a subject range is cut out.

FIG. 13 is a diagram of an image showing only the subject range 40a. The computing unit 12 deletes portions other than the subject range 40a from the captured image 40, generates an image including only the subject range 40a, and outputs the contamination-related information including the image of only the subject range 40a. In this case, only the subject range 40a is shown to a user so that the user can easily recognize contamination of the drain pan 26.

Figure 14:
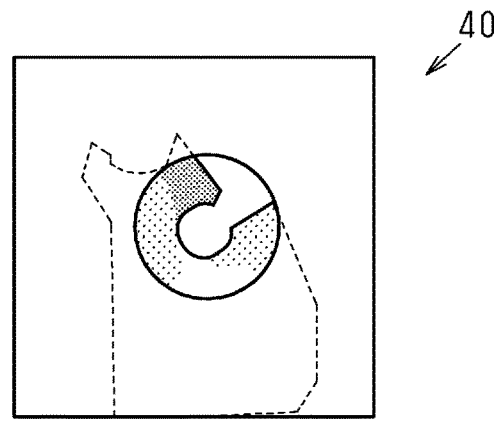
FIG. 14 is a diagram of the captured image showing part of the subject range.

FIG. 14 is a diagram of an image showing part of the subject range 40a. In FIG. 14, portions other than one part of the subject range 40a is shown in a light color.

The computing unit 12 may cut out part of the subject range 40a from the captured image 40, generate an image including the cut-out portion, and output the contamination-related information including the image of the cut-out portion. In the example shown in FIG. 14, the computing unit 12 cuts out a region around an inlet of the drain pump 27 from the captured image 40. The collected contaminants in the region around the inlet of the drain pump 27 obstructs water flow and causes clogging. Thus, an image analysis of the region around the inlet of the drain pump 27 allows for prediction of clogging caused by contaminants.

Figure 15:
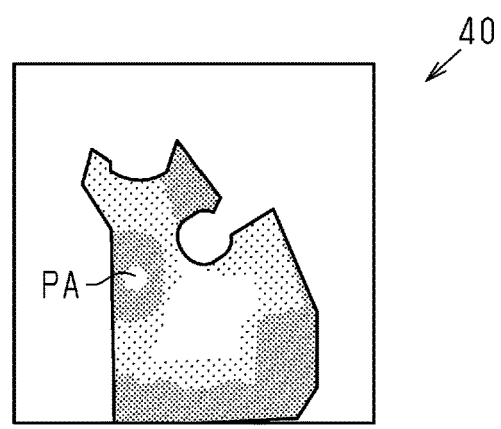
FIG. 15 is a diagram of the captured image before elimination of a reflection.
Figure 16:
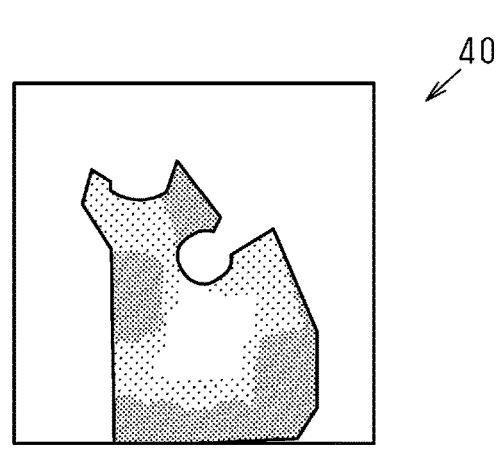
FIG. 16 is a diagram of the captured image after elimination of the reflection.

FIG. 15 is a diagram of the captured image 40 before elimination of a reflection PA, and FIG. 16 is a diagram of the captured image 40 after elimination of the reflection PA.

The camera 30 illuminates the drain pan 26 with a lighting device and captures an image. The light for image-capturing may be reflected by a metal portion of the drain pump 27, and the water surface of the drain pan 26 may include a reflection of the metal portion. Such a reflection PA will appear in a specific region of the drain pan 26 and have a specific shape. Thus, the reflection PA can be easily found and eliminated. When the captured image 40 includes the reflection PA, the computing unit 12 eliminates the reflection PA from the subject range 40a and forms the captured image 40. Specifically, the computing unit 12 determines that a white portion found in the captured image 40 is the reflection PA and processes the found portion to have the same color as the surrounding portion. If the captured image 40 includes an unnaturally white portion, a user who is not aware of the reflection may erroneously determine that the white portion is not seriously contaminated. The elimination of the reflection PA reduces such erroneous determinations of the user.

The computing unit 12 may further include a functionality to generate a contamination chart as the contamination-related information. In an example, the computing unit 12 forms a contamination chart that indicates a contaminant amount with respect to the elapsed time based on images of the subject 2 captured at different times. The computing unit 12 generates the contamination-related information including the contamination chart and a contaminant amount threshold value B used to determine whether cleaning is necessary. In the contamination chart, the computing unit 12 highlights a point of time (threshold-value exceeding time TA) at which the contaminant amount reaches the contaminant amount threshold value B. The time at which the contaminant amount reaches the contaminant amount threshold value B is calculated based on the contaminant amount threshold value B and an approximate expression obtained by performing a regression calculation on each stream of data in the contamination chart (refer to FIG. 17). Further preferably, when the contaminant amount reaches the contaminant amount threshold value B, the computing unit 12 outputs the contamination-related information to the user terminal 16.

Specifically, the computing unit 12 periodically obtains the captured image 40 of a specified subject 2. The computing unit 12 calculates the contaminant amount whenever the captured image 40 is obtained. The computing unit 12 compares the contaminant amount to the contaminant amount threshold value B and outputs the contamination-related information to the user terminal 16 when the comparison result indicates that the contaminant amount has exceeded the contaminant amount threshold value B. The contamination-related information includes at least one of a content indicating that the contaminant amount has reached the threshold value B, a content indicating that cleaning is desirable, or a content indicating that a pump is likely to clog.

An example of the contamination chart will now be described.

The computing unit 12 calculates a degree of contamination advancement as follows. In an example, the degree of contamination advancement is evaluated from expansion of a contaminated region.

(a) In a first example, the computing unit 12 calculates the degree of contamination advancement based on the area of a region in the subject range 40a of the captured image 40 where the hue is in a predetermined range. Specifically, the computing unit 12 forms the mask 41 that is suitable for the captured image 40 from the template mask 42 as described above. The computing unit 12 calculates the area of a region in the subject range 40a where the hue is in a predetermined range based on the captured image 40, on which the mask 41 is superimposed. For example, when calculating the area of collected contaminants, the computing unit 12 counts the number of pixels having the hue of 30 or greater and 60 or less in the captured image 40, on which the mask 41 is superimposed, and obtains the area of collected contaminants. When calculating the area of turbid water, the computing unit 12 counts the number of pixels having the hue of 10 or greater and 30 or less in the captured image 40, on which the mask 41 is superimposed, and obtains the area of turbid water. Further, the computing unit 12 may calculate the sum of the area of collected contaminants and the area of turbid water as the area of contamination. The computing unit 12 outputs the area of contamination as the degree of contamination advancement. The computing unit 12 may output the area of collected contaminants as "the degree of collected contaminant advancement". Further, the computing unit 12 may output the area of turbid water as "the degree of turbid water advancement".

(b) In a second example, the computing unit 12 calculates the degree of contamination advancement based on the ratio between the area of the subject range 40a in the captured image 40 and the area of a region where the hue is in a predetermined range in the subject range 40a of the captured image 40. In this case, the degree of contamination advancement is indicated as a percentage. When the degree of contamination advancement is 100%, the contamination is most advanced.

Figure 17:
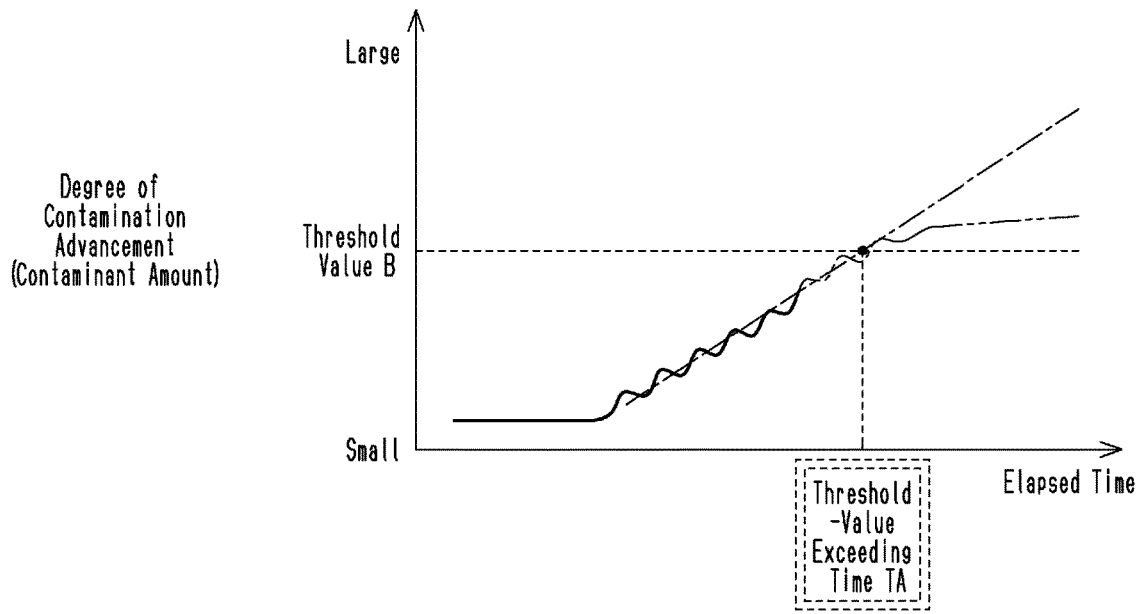
FIG. 17 is a graph showing changes in a contaminant amount.

A chart indicating changes in collected contaminants of the drain pan 26 will now be described with reference to FIG. 17. Contamination of the drain pan 26 (degree of contamination advancement) increases as time elapses. During a period in which the air conditioner performs a cooling operation, the drain pump 27 drains water out of the drain pan 26. Contaminants are drained together with the water. However, residual contaminants deposited in the drain pan 26 will gradually increase contamination. During a period in which the air conditioner does not perform cooling operations, water that collects in the drain pan 26 will be minimal if any does collect, and the drain pump 27 may not be actuated. Consequently, contamination of the drain pan 26 will advance gradually. In this manner, contamination of the drain pan 26 will increase year by year.

The computing unit 12 performs a regression calculation to calculate the relationship of the time at which the captured image 40 is acquired and the degree of contamination advancement. For example, the degree of contamination advancement with respect to the acquisition time is approximated into a linear expression or an exponent function.

Based on the approximate expression (refer to single-dashed line in FIG. 17), the time at which the degree of contamination advancement exceeds the threshold value B (contaminant amount threshold value B as indication of cleaning) is calculated as a threshold-value exceeding time TA. The threshold-value exceeding time TA is "the time at which the contaminant amount reaches the contaminant amount threshold value B". The threshold-value exceeding time TA is highlighted in the contamination-related information including the chart (refer to FIG. 17). Further, the computing unit 12 outputs the threshold-value exceeding time TA to the user terminal 16. Preferably, the contamination-related information includes an image in which the contaminated region is highlighted.

Figure 18:
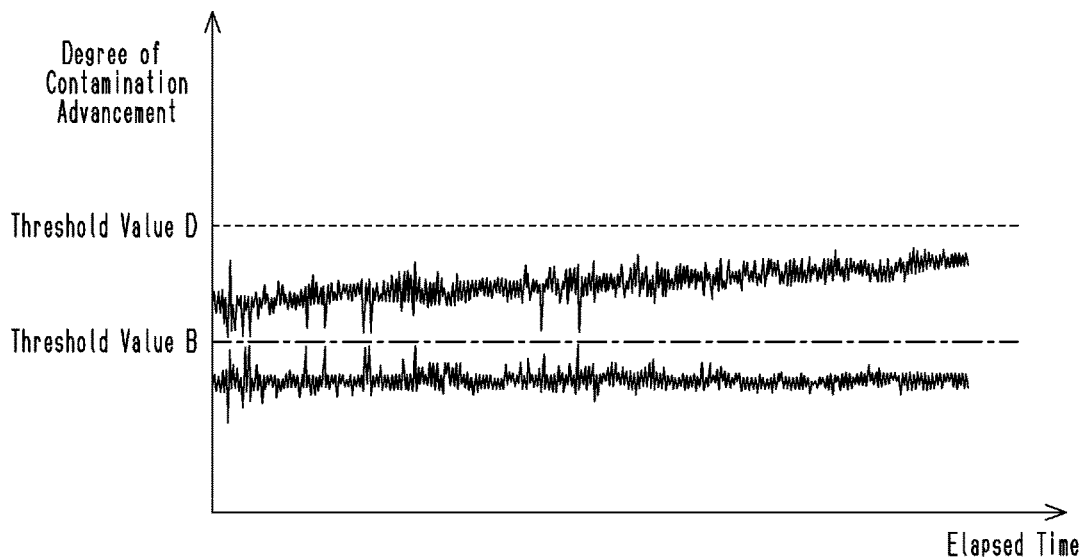
FIG. 18 is a diagram including a chart for collected contaminants and a chart for turbid water.

As shown in FIG. 18, the computing unit 12 may generate the contamination-related information including a chart for collected contaminants and a chart for turbid water. The chart for turbid water can be formed in a similar manner as the chart for collected contaminants. In FIG. 18, the upper chart indicates changes in turbid water over time. The lower chart indicates changes in collected contaminants over time. In FIG. 18, the threshold value B is the amount of collected contaminants indicating when to perform cleaning, and a threshold value D is the amount of turbid water indicating when to perform cleaning.

Further preferably, the computing unit 12 calculates a failure probability in a predetermined future period based on the captured image 40 (example of image data) of the subject 2. The computing unit 12 generates the contamination-related information including the failure probability. When the failure probability is greater than a predetermined probability, the computing unit 12 highlights the failure probability. The predetermined future period is defined as, for example, a period of a certain number of months after one year from when contamination is detected based on the captured image 40. In an example, the failure probability is calculated from the ratio of the contaminant amount and the threshold value B at the time of contamination detection. When the failure probability is greater than a predetermined probability, the computing unit 12 displays the failure probability in a distinguishable color (for example, red). In an example, the computing unit 12 includes the captured image 40 in which the contaminated region is highlighted, and the failure probability, which is highlighted when shown, in the contamination-related information.

When the failure probability is greater than a predetermined probability, the computing unit 12 outputs the contamination-related information to the user terminal 16. Specifically, the computing unit 12 periodically obtains the captured image 40 of a specified subject 2 (drain pan 26). The computing unit 12 calculates the contaminant amount and the failure probability whenever the captured image 40 is obtained. The computing unit 12 compares the failure probability with the predetermined probability and outputs the failure probability to the user terminal 16 when the comparison result indicates that the failure probability is greater than the predetermined probability. The contamination-related information may further include information indicating that the failure probability is greater than the predetermined probability and information indicating that a failure such as pump clogging or the like is likely to occur.

Further preferably, the computing unit 12 calculates an air pollution level in a predetermined future period based on the captured image 40 of the subject 2. The computing unit 12 generates the contamination-related information including the air pollution level and highlights the air pollution level in the contamination-related information when the air pollution level is greater than an upper limit value.

Air pollutants include bacteria, suspended particulate matter, and dust. When the air is highly polluted, contamination of the subject 2 expands easily. A change in the contaminant amount indicates the air pollution level. The computing unit 12 calculates the air pollution level in a predetermined future period based on changes in the contaminant amount with respect to elapsed time. The predetermined future period is set to the near future. For example, the predetermined future period is defined as a period of a certain number of days from one day after a change in the contaminant amount is calculated. In an example, the computing unit 12 defines a ratio between a change amount in the contaminant amount and the maximum value of the change amount in the contaminant amount as the air pollution level. The maximum value of the change in the contaminant amount is a value estimated and set in advance based on the past maximum value of the change in the contaminant amount. When the air pollution level is higher than an upper limit value, the computing unit 12 displays the air pollution level in the contamination-related information in a distinguishable color (for example, red). In an example, the computing unit 12 includes the captured image 40, in which the contaminated region is highlighted, and the air pollution level, which is highlighted when shown, in the contamination-related information. When the air pollution level is higher than an upper limit value, the computing unit 12 outputs the contamination-related information to the user terminal 16.

Specifically, the computing unit 12 periodically obtains the captured image 40 of a specified subject 2 (drain pan 26). The computing unit 12 calculates the contaminant amount, a change in the contaminant amount, and the air pollution level whenever the captured image 40 is obtained. The computing unit 12 compares the air pollution level and an upper limit value and outputs the failure probability to the user terminal 16 when the comparison result indicates that the air pollution level is higher than the upper limit value.

Further preferably, the computing unit 12 forms a contamination chart for each of a number of subjects 2 in the same device. Specifically, the computing unit 12 obtains the captured image 40, captured by the camera 30, of an additional subject 2a that differs from the subject 2 (drain pan 26). Preferably, the additional subject 2a is an article related to the contaminants of the drain pan 26, or the subject 2. In an example, the additional subject 2a is the heat exchanger 23 in the indoor unit 21. The drain pan 26 is mainly contaminated by air pollutants (such as bacteria and dust) and contaminants collected on the heat exchanger 23. When water condenses on the heat exchanger 23, the contaminants on the heat exchanger 23 collect in the drain pan 26, in which case, contamination of the drain pan 26 is related to contamination of the heat exchanger 23.

The computing unit 12 forms a first contamination chart that indicates changes in the contaminant amount with respect to the elapsed time based on the captured images 40 of the subject 2 captured at different times.

The computing unit 12 forms a second contamination chart that indicates changes in the contaminant amount with respect to the elapsed time based on the captured images 40 of the additional subject 2a captured at different times.

The computing unit 12 generates contamination-related information. The contamination-related information includes a chart that shows both of the first contamination chart for the subject 2 and the second contamination chart for the additional subject 2a with a common time axis. The computing unit 12 highlights the first contamination chart for the subject 2 in the contamination-related information.

Contamination of the drain pan 26 is related to contamination of the heat exchanger 23 in the following manner. More contaminants accumulate in the drain pan 26 during a period in which cooling operations are performed than a period in which cooling operations are not performed. In contrast, less contaminants accumulate on the heat exchanger 23 during a period in which cooling operations are performed than a period in which cooling operations are not performed. During a period in which cooling operations are performed, the heat exchanger 23 of the indoor unit 21 is cooled. This condenses water that falls from the heat exchanger 23 into the drain pan 26. Thus, less contaminants accumulate on the heat exchanger 23 and more contaminants accumulate in the drain pan 26. During a period in which cooling operations are not performed, the heat exchanger 23 of the indoor unit 21 is not cooled. Thus, water does not condense and fall from the heat exchanger 23. Accordingly, more contaminants accumulate on the heat exchanger 23 and less contaminants accumulate in the drain pan 26. The contamination-related information including the two charts provides information on such a relationship. The computing unit 12 highlights the first contamination chart of the subject 2 in the contamination-related information to be more distinguishable than the second contamination chart. This allows the user to recognize which chart has more important information. Also, the user can compare the two charts and estimate contamination of the subject 2.

Figure 19:
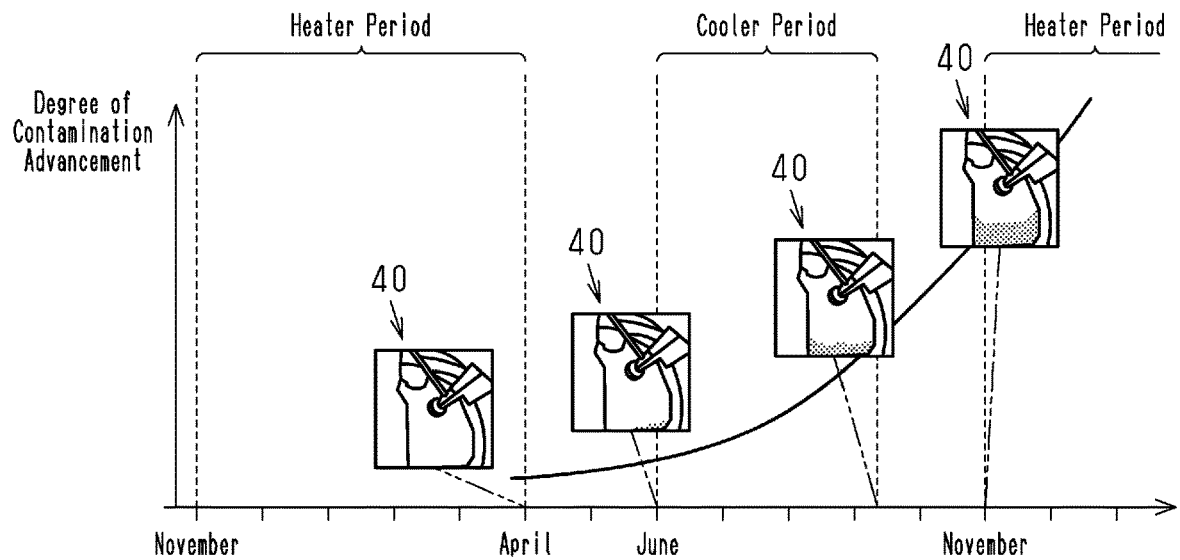
FIG. 19 is a diagram showing changes in the contaminant amount and images captured at different periods.

The computing unit 12 may generate the contamination-related information as shown in FIG. 19.

The computing unit 12 generates the contamination-related information including the captured images 40 captured at different times and a contamination chart that indicates changes in the contaminant amount with respect to elapsed time. For example, the captured images 40 are each linked by a line to a corresponding image-capturing time that is marked on the time axis. Such a contamination chart provides the user with the degree of contamination advancement together with images showing the contamination state.

The computing unit 12 may include the following functionality.

Figure 20:
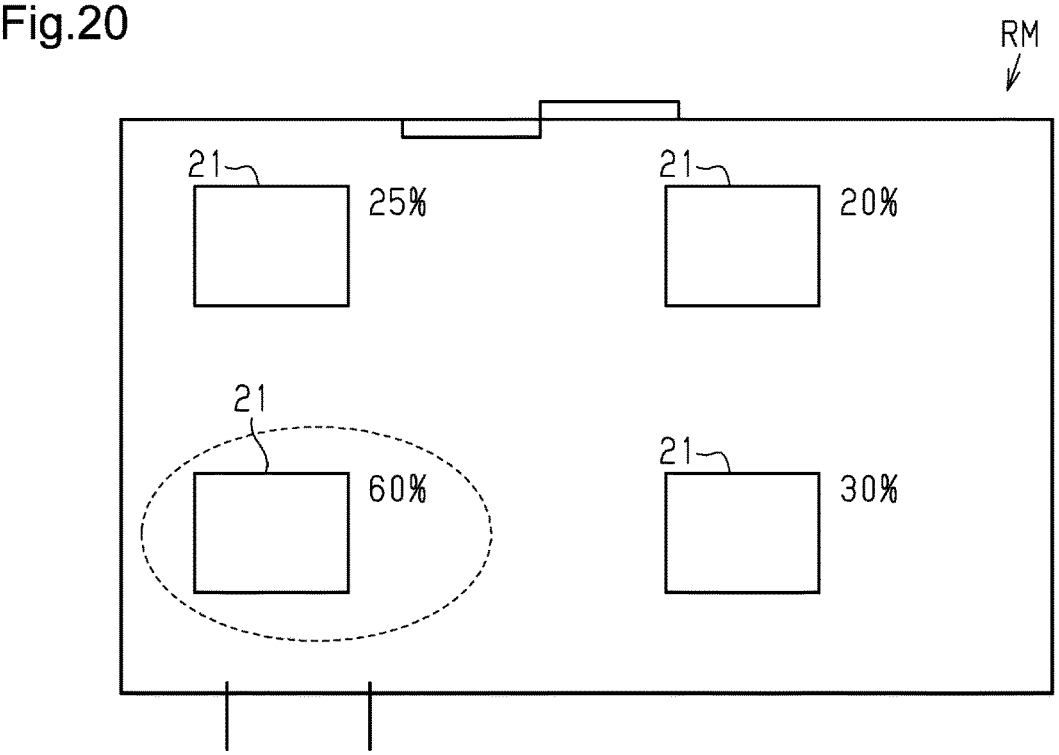
FIG. 20 is a diagram showing a layout of indoor units and degrees of contamination advancement of the indoor units.

FIG. 20 is a diagram that shows a layout of a number of air conditioners installed in the same room RM and the degree of contamination advancement in each air conditioner.

The computing unit 12 obtains the captured image 40 of each of the indoor units 21 installed in the room RM and calculates the degree of contamination advancement for each indoor unit 21. Further, the computing unit 12 obtains layout information of the indoor units 21 in the room RM. The layout information includes information related to the layout of the indoor units 21 in the room RM. The computing unit 12 generates a layout diagram in which the degree of contamination advancement of the drain pan 26 is shown near a symbol representing each indoor unit 21. Furthermore, the computing unit 12 highlights the indoor unit 21 having a degree of contamination advancement that exceeds a predetermined value (for example, 50%) in the layout diagram. In the example shown in FIG. 20, the symbol representing the indoor unit 21 of which the degree of contamination advancement exceeds the predetermined value is circled and emphasized. The computing unit 12 outputs the layout diagram that shows the degrees of contamination advancement as the contamination-related information. With this configuration, the user can check where the drain pan 26 is likely to become contaminated in the room RM. Thus, the user can particularly clean the indoor unit 21 that is located at a position where contamination tends to occur.

Figure 21:
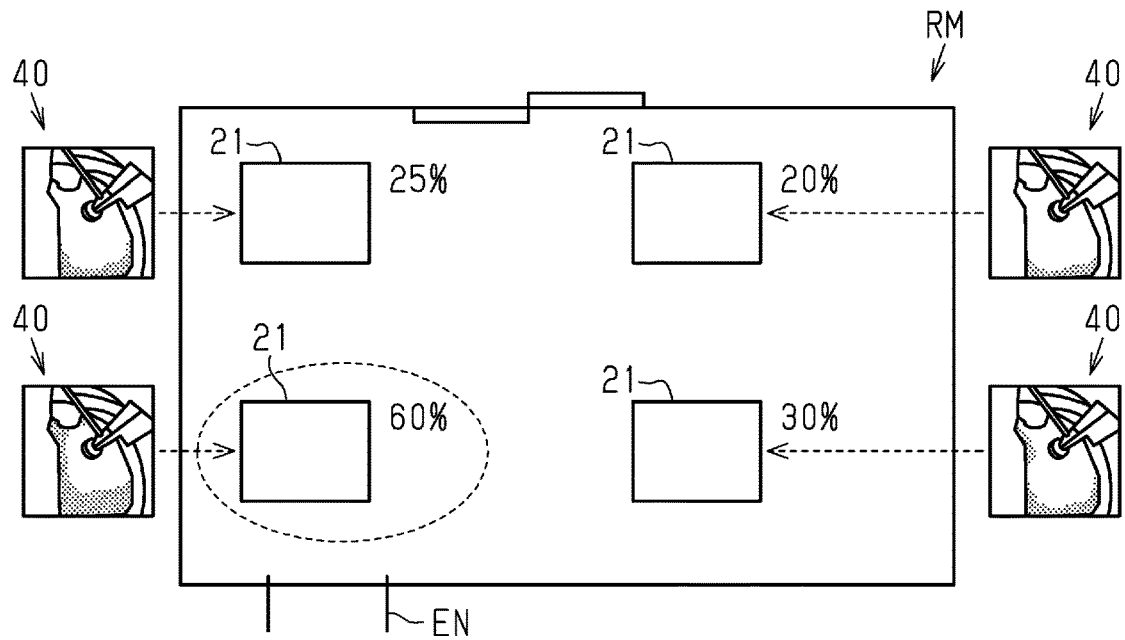
FIG. 21 is a diagram showing the layout of the indoor units, the degrees of contamination advancement of the indoor units, and captured images.

As shown in FIG. 21, when generating the layout diagram that indicates the degrees of contamination advancement, the computing unit 12 may include a captured image of the drain pan 26 of each air conditioner in the layout diagram. This layout diagram can provide the user with the degree of contamination advancement of the drain pan 26 of each indoor unit 21 and the image showing the contamination state of the drain pan 26.

Figure 22:
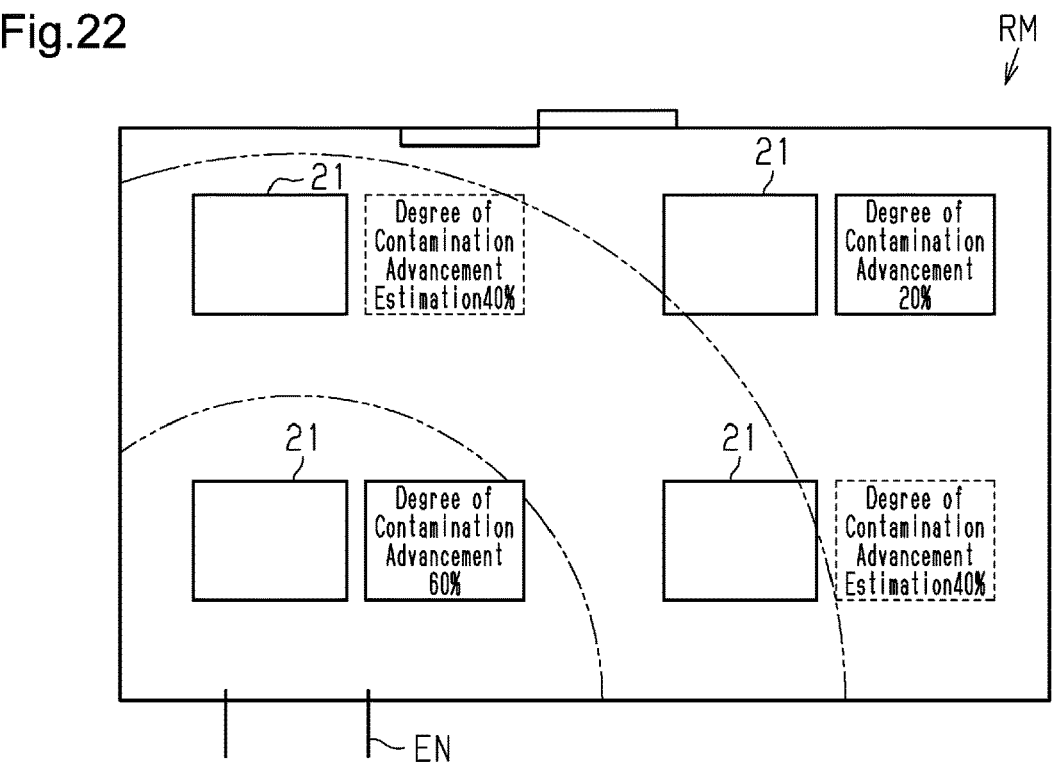
FIG. 22 is a diagram illustrating the relationship between the layout of the indoor units and estimated degrees of contamination advancement.

As shown in FIG. 22, the degree of contamination advancement in the room RM may be estimated for the drain pan 26 of each predetermined indoor unit 21.

As shown in FIG. 22, only a specified one of the indoor units 21 in the room RM may include the camera 30. In this case, the computing unit 12 estimates the degree of contamination advancement of the drain pan 26 of each indoor unit 21 that does not include the camera 30 based on the degree of contamination advancement of the drain pan 26 of the indoor unit 21 that includes the camera 30. For example, the computing unit 12 classifies the indoor units 21 in accordance with the distance from an entrance EN of the room RM. The computing unit 12 stores a rule set in advance indicating that drain pans 26 that are farther from the entrance EN of the room RM are less contaminated. The computing unit 12 estimates the degree of contamination advancement of the drain pan 26 of the indoor unit 21 based on the rule. In the present example, the degree of contamination advancement on the drain pan 26 of the indoor unit 21 that is relatively close to the entrance EN of the room RM and the degree of contamination advancement on the drain pan 26 of the indoor unit 21 that is relatively far from the entrance EN of the room RM are calculated based on the captured images. The indoor units 21 that are located at an intermediate distance from the entrance EN of the room RM do not include the camera 30. The computing unit 12 calculates the average value of the degree of contamination advancement of the drain pan 26 of the indoor unit 21 that is relatively close to the entrance EN of the room RM and the degree of contamination advancement of the drain pan 26 of the indoor unit 21 that is relatively far from the entrance EN of the room RM as the degree of contamination advancement of the drain pan 26 of each indoor unit 21 located at an intermediate distance from the entrance EN of the room RM.

The computing unit 12 may estimate the degree of contamination advancement of a predetermined indoor unit 21 based on the contamination chart of the indoor unit 21 that is in a similar environment.

Figure 23:
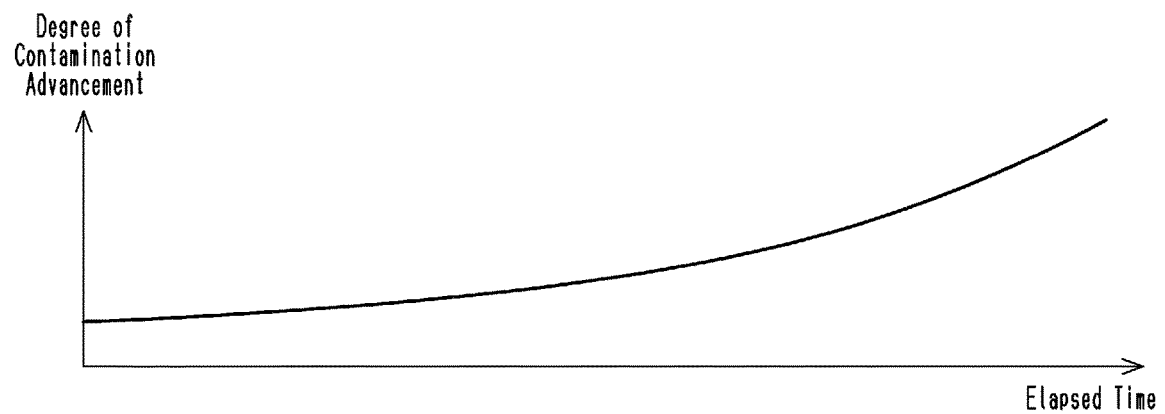
FIG. 23 is a contamination chart for another indoor unit in a similar environment.

FIG. 23 is a contamination chart of indoor units 21 installed in rooms RM used under similar environments. When indoor units 21 are installed under similar environments, the degree of contamination in the drain pan 26 of each predetermined indoor unit 21 advances in the same manner. Thus, the contamination chart of the degree of contamination advancement of one indoor unit 21 can be used to estimate the degree of contamination advancement of another indoor unit 21 that is in a similar environment.

The computing unit 12 determines similarity in environments based on the purpose information of the room RM where the indoor unit 21 is installed and the installation position of the indoor unit 21. The computing unit 12 checks the purpose information and the installation position of the indoor unit 21 for which the degree contamination advancement is estimated to determine whether there is a chart for an indoor unit 21 that is in a similar environment. The computing unit 12 has a database of contamination charts for the drain pans 26 of the indoor unit 21 and selects the contamination chart of the indoor unit 21 that is in the similar environment from the database.

Figure 24:
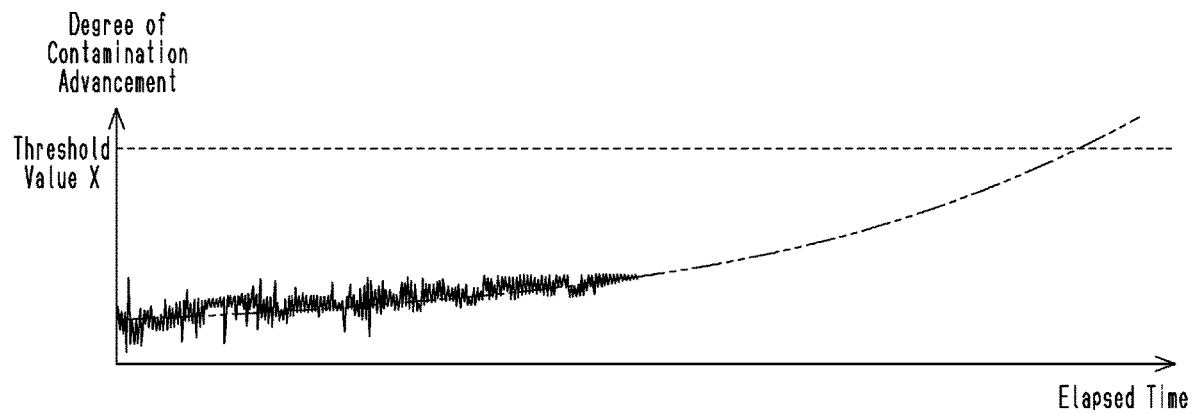
FIG. 24 is a contamination chart for the indoor unit.

As shown in FIG. 24, the computing unit 12 superimposes the data of the selected contamination chart (double-dashed line in FIG. 24) of the indoor unit 21 in a similar environment with the degree of contamination advancement data obtained from the indoor unit 21 of which the degree of contamination advancement is estimated. The computing unit 12 calculates when the degree of contamination advancement will reach a preset threshold value X based on the threshold value X and the contamination chart of the indoor unit 21 in the similar environment.

The operation of the present embodiment will now be described. The computing unit 12 generates contamination-related information in which the contaminated region is highlighted in the captured image 40. The computing unit 12 outputs the contamination-related information to the user terminal 16. The highlighting allows the user to easily recognize contamination.

The present embodiment has the following advantages.

(1) The computing unit 12 (computer P) of the information providing system SA obtains the captured image 40 (image data) and finds a contaminated region in the captured image 40. The computing unit 12 generates contamination-related information highlighting the contaminated region in the captured image. Further, the computing unit 12 outputs the contamination-related information to the user terminal 16. With this configuration, the contaminated region is highlighted so that the user can easily recognize the information related to contamination.

(2) The computing unit 12 obtains the first captured image (first image data) captured at a preceding time and the second captured image (second image data) captured at a subsequent time after the preceding time. The computing unit 12 finds a contaminated region in the second captured image, generates contamination-related information including the first captured image and the second captured image, and highlights the contaminated region in the second captured image in the contamination-related information. With this configuration, the first captured image captured at the preceding time is compared to the second captured image so that the user can recognize the degree of contamination advancement.

(3) The computing unit 12 identifies and highlights the types of contamination (refer to FIG. 10). With this configuration, the types of contamination are identified so that the user can easily recognize how the subject is contaminated.

(4) The computing unit 12 identifies the types of contamination in accordance with hue (refer to FIG. 10). As described above, the types of contamination can be distinguished in accordance with hue. In the above-described configuration, the types of contamination are accurately identified using this technical feature.

(5) The computing unit 12 adjusts the saturation so that each type of contamination can be identified. With this configuration, the user can visually check contamination and distinguish the type of contamination.

(6) The computing unit 12 forms the contamination chart that indicates changes in the contaminant amount with respect to the elapsed time based on the captured images 40 of the subject 2 captured at different times. The computing unit 12 generates the contamination-related information including the contamination chart and the threshold value B that indicates when to perform cleaning. In the contamination chart, the computing unit 12 highlights a time point (threshold-value exceeding time TA in FIG. 11) at which the contaminant amount will reach the contaminant amount threshold value B. With this configuration, the user can easily recognize the time point at which the contaminant amount will reach the contaminant amount threshold value B.

(7) The computing unit 12 calculates the failure probability in a predetermined future period based on the captured image 40 of the subject 2 and generates the contamination-related information including the failure probability. When the failure probability is greater than a predetermined probability, the computing unit 12 highlights the failure probability. This configuration allows the user to recognize the failure probability.

(8) The computing unit 12 calculates the air pollution level in a predetermined future period based on the captured image 40 of the subject 2 and generates the contamination-related information including the air pollution level. When the air pollution level is greater than the upper limit value, the computing unit 12 highlights the air pollution level. This configuration allows the user to recognize the air pollution level.

(9) The computing unit 12 further obtains the captured images 40 of the additional subject 2a and forms a chart showing changes in the contaminant amount with respect to the elapsed time based on the captured images 40 of the additional subject 2a captured at different times. The computing unit 12 generates the contamination-related information including a chart that shows the contamination chart for the subject 2 and the contamination chart for the additional subject 2a with a common time axis. The computing unit 12 highlights the contamination chart for the subject 2 in the contamination-related information. With this configuration, the tendency of contamination in the subject can be recognized through comparison with contamination in the additional subject.

Modified Examples

In addition to the above-described embodiment, the contamination detector 1 of the present disclosure is applicable to, for example, modified examples of the above embodiment that are described below and combinations of at least two of the modified examples that do not contradict each other.

In the above embodiment, the computing unit 12 (computer P) may output the identification information, the location information, and the purpose information of the air conditioner 20 including the subject 2 to the user terminal 16. The user who receives the identification information, the location information, and the purpose information can recognize the model, the installation location, and the application of the air conditioner 20 to determine in advance how to conduct maintenance.

The computing unit 12 may be configured as follows. The computing unit 12 is configured to be usable by users. Specifically, the computing unit 12 is configured to establish communication with subjects 2 and user terminals 16. The computing unit 12 holds an address book to manage information transmission between the subjects 2 and the user terminals 16. The address book links the identification number of the air conditioner 20 with the user terminals 16 of the users using the air conditioner 20. When the computing unit 12 obtains the captured image 40 of the subject 2, the image-captured time, and the identification number from the acquiring unit 11, the computing unit 12 calculates the degree of contamination advancement and notification items. Then, the computing unit 12 refers to the address book and outputs the degree of contamination advancement and the notification items to the user terminals 16.

The acquiring unit 11 and the controller 10 of the contamination detector 1 may be configured as a single unit. Such a contamination detector 1 is located in the proximity of the air conditioner 20. In this case, the contamination detector 1 may directly establish communication with the user terminal 16 without the network N.

The computing unit 12 of the contamination detector 1 may be arranged in the user terminal 16. The computing unit 12 may be configured by an application installed in the user terminal 16 and a calculation circuit in the user terminal 16.

The acquiring unit 11 and the computing unit 12 of the contamination detector 1 may be arranged in the user terminal 16. For example, the acquiring unit 11 and the computing unit 12 are arranged in a personal computer. In this case, the acquiring unit 11 acts as a communication device or a reader of a recording medium. The computing unit 12 may be configured by an application and a calculation circuit. The personal computer obtains the captured image 40 by an input operation of a user.

It should be understood that the present device may be embodied in many other specific forms within the scope and equivalence of the present device described in the appended claims.

The invention claimed is:

1. An information providing system that provides information related to contamination of a drain pan of an air conditioner, the information providing system comprising:
a computer connected to a camera and a user terminal, wherein the computer is configured to:
obtain image data of the drain pan captured by the camera;
convert the image data to image data from which a type of contamination is easily recognized, the type of contamination including collected contaminants or turbid water;
find a contaminated region in the image data in accordance with the type of contamination based on a hue value of every pixel in the image data that is converted;
generate contamination-related information in which the contaminated region is highlighted in accordance with the type of contamination so that the type of contamination can be identified in the image data;
form a contamination chart indicating a change in a contaminant amount with respect to elapsed time based on image data of the drain pan captured at different times;
generate the contamination-related information including the contamination chart and a threshold value of the contaminant amount indicating when to perform cleaning;
highlight a time point at which the contaminant amount reaches the threshold value of the contamination in the contamination chart; and
output the contamination-related information to the user terminal.

2. The information providing system according to claim 1, wherein the computer is configured to:
obtain first image data of a preceding time and second image data of a subsequent time after the preceding time;
find the contaminated region in the second image data;
generate the contamination-related information including the first image data and the second image data; and
highlight the contaminated region in the second image data in the contamination-related information.

3. The information providing system according to claim 1, wherein the computer is configured to highlight a type of contamination to allow for identification by adjusting saturation.

4. The information providing system according to claim 1, wherein the computer is configured to:
obtain image data of an additional subject, which differs from the drain pan, captured by a camera;
form a contamination chart indicating a change in a contaminant amount with respect to elapsed time based on image data of the additional subject captured at different times;
generate the contamination-related information including a chart that shows both of the contamination chart for the drain pan and the contamination chart for the additional subject with a common time axis; and
highlight the contamination chart for the drain pan in the contamination-related information.

5. An information providing system that provides information related to contamination of a drain pan of an air conditioner, the information providing system comprising:
a computer connected to a camera and a user terminal, wherein the computer is configured to:
obtain image data of the drain pan captured by the camera;
find a contaminated region in the image data in accordance with a type of contamination, the type of contamination including collected contaminants or turbid water;
generate contamination-related information in which the contaminated region is highlighted in the image data;
calculate a failure probability in a predetermined future period based on the image data of the drain pan;
generate the contamination-related information including the failure probability and in which the failure probability is highlighted when the failure probability is greater than a predetermined probability;
form a contamination chart indicating a change in a contaminant amount with respect to elapsed time based on image data of the drain pan captured at different times;
generate the contamination-related information including the contamination chart and a threshold value of the contaminant amount indicating when to perform cleaning;
highlight a time point at which the contaminant amount reaches the threshold value of the contamination in the contamination chart; and
output the contamination-related information to the user terminal.

6. An information providing system that provides information related to contamination of a drain pan of an air conditioner, the information providing system comprising:
a computer connected to a camera and a user terminal, wherein the computer is configured to:
obtain image data of the drain pan captured by the camera;
find a contaminated region in the image data in accordance with a type of contamination, the type of contamination including collected contaminants or turbid water;

generate contamination-related information in which the contaminated region is highlighted in the image data;

calculate an air pollution level in a predetermined future period based on the image data of the drain pan;

generate the contamination-related information including the air pollution level and in which the air pollution level is highlighted when the air pollution level is greater than an upper limit value;

form a contamination chart indicating a change in a contaminant amount with respect to elapsed time based on image data of the drain pan captured at different times;

generate the contamination-related information including the contamination chart and a threshold value of the contaminant amount indicating when to perform cleaning;

highlight a time point at which the contaminant amount reaches the threshold value of the contamination in the contamination chart; and output the contamination-related information to the user terminal.

7. An information providing system that provides information related to contamination of a drain pan of an air conditioner, the information providing system comprising: a computer connected to a camera and a user terminal, wherein the computer is configured to:

obtain image data of the drain pan captured by the camera;

convert the image data to image data of HSV format;

find a contaminated region in the image data in accordance with a type of contamination based on a hue value of every pixel in the image data that is converted, the type of contamination including collected contaminants or turbid water;

generate contamination-related information in which the contaminated region is highlighted in accordance with the type of contamination so that the type of contamination can be identified in the image data;

form a contamination chart indicating a change in a contaminant amount with respect to elapsed time based on image data of the drain pan captured at different times;

generate the contamination-related information including the contamination chart and a threshold value of the contaminant amount indicating when to perform cleaning;

highlight a time point at which the contaminant amount reaches the threshold value of the contamination in the contamination chart; and output the contamination-related information to the user terminal.

8. The information providing system according to claim 7, wherein the computer is configured to:

obtain first image data of a preceding time and second image data of a subsequent time after the preceding time;

find the contaminated region in the second image data;

generate the contamination-related information including the first image data and the second image data; and highlight the contaminated region in the second image data in the contamination-related information.

9. The information providing system according to claim 8, wherein the computer is configured to identify and highlight a type of contamination.

10. The information providing system according to claim 9, wherein the computer is configured to highlight the type of contamination to allow for identification by adjusting saturation.

11. The information providing system according to claim 7, wherein the computer is configured to:

obtain image data of an additional subject, which differs from the drain pan, captured by a camera;

form a contamination chart indicating a change in a contaminant amount with respect to elapsed time based on image data of the additional subject captured at different times;

generate the contamination-related information including a chart that shows both of the contamination chart for the drain pan and the contamination chart for the additional subject with a common time axis; and highlight the contamination chart for the drain pan in the contamination-related information.

* * * * *